United States Patent
Borrey et al.

(10) Patent No.: US 6,370,277 B1
(45) Date of Patent: Apr. 9, 2002

(54) VIRTUAL RESCANNING: A METHOD FOR INTERACTIVE DOCUMENT IMAGE QUALITY ENHANCEMENT

(75) Inventors: Roland Borrey, Villa Park; Anthony Macciola, Chino, both of CA (US)

(73) Assignee: Kofax Image Products, Inc., Irvine, CA (US)

( * ) Notice: Subject to any disclaimer, the term of this patent is extended or adjusted under 35 U.S.C. 154(b) by 0 days.

(21) Appl. No.: 09/206,753

(22) Filed: Dec. 7, 1998

(51) Int. Cl.[7] .............................................. G06T 11/40
(52) U.S. Cl. ...................................... 382/260; 382/254
(58) Field of Search ........................ 382/260, 261–269, 382/254

(56) References Cited

U.S. PATENT DOCUMENTS

| | | | |
|---|---|---|---|
| 4,836,026 A | * 6/1989 | P'an et al. ..................... 73/620 |
| 5,317,646 A | * 5/1994 | Sang, Jr. et al. ................. 382/9 |
| 5,563,723 A | * 10/1996 | Beaulieu et al. ............ 358/461 |
| 6,005,968 A | * 12/1999 | Granger ..................... 382/162 |
| 6,154,217 A | * 11/2000 | Aldrich ....................... 345/431 |

* cited by examiner

*Primary Examiner*—Thomas D. Lee
*Assistant Examiner*—Stephen Brinich
(74) *Attorney, Agent, or Firm*—Morland C. Fischer

(57) ABSTRACT

According to the present invention, an image processing system for processing scanned images using a user predefined parameters and acceptable tolerances. When a scanned image falls outside the scope of the predefined parameter tolerances, the system invokes a real-time user interactive process which involves a continuous looping back process comprising prompting the user for image setting data, loading the image data from a fast memory device such as a cache, generating processed image data and displaying the processed image data on a display terminal, prompting the user for acceptance of the processed image data. This process loops back to the beginning until the user accepts the processed image data. This invention provides the user with an efficient and time saving method of scanning documents by precluding the user having to physically reload the document into the scanner should the scanned quality be unacceptable, and an interactive method to set the attributes of a paper scanner.

10 Claims, 6 Drawing Sheets

VIRTUAL RESCANNING: A METHOD FOR INTERACTIVE DOCUMENT IMAGE QUALITY ENHANCEMENT

BACKGROUND OF THE INVENTION

1. Field of the Invention

The present invention relates to a scanning system comprising of a scanner and an image acquisition controller and a method for interactively improving the quality of scanned document images in real-time.

2. Discussion of the Background

In recent times, scanners have become very popular in both the consumer sector and the commercial sector. Scanners are typically connected to an image acquisition controller. After scanning in a document, the scanned image is displayed on the image acquisition controller monitor. The document can be a text document, a graphic document, or a photographic document.

There are many applications for the use of a scanner. One application is for archiving documents. Instead of maintaining paper documents, one can simply scan in the documents and archive the image files on computer storage media, such as hard drives, compact discs, tape drives, or DVDs. Another application is for the storage of photographs. Instead of maintaining photo albums, the photographic images are stored in a computer storage media. The photographic images can be retrieved anytime and can be printed to a printer connected to the image acquisition controller. There are numerous scanner applications. However, this invention deals with the enhancement of the scanned image and not the applications of a scanner.

A modern scanner system consists of a scanner and an image acquisition controller as shown in FIG. 1. The scanner will typically be comprised of an apparatus for receiving documents to be scanned and a scanner card for placing in an expansion slot of an image acquisition controller. The apparatus for receiving documents to be scanned can be of a flat-bed type or a drum type of apparatus. The scanner card will contain imaging processing hardware. Typically, the imaging processing hardware will be comprised of: a charged couple device, a normalization processor, an image processor, and an image cache. The image cache may or may not reside on the scanner card. If it does not reside on the scanner card, then it may reside on the image acquisition controller or utilize the image acquisition controller's memory as an image cache. FIG. 2 depicts a design in which the image cache is resident on the scanner card. FIG. 3 depicts a possible design in which the image cache is not resident on the scanner card.

FIG. 4 depicts an image control settings displayed on an image display or a computer monitor that can be adjusted on the image acquisition controller.

The common image control setting is a static type of system and does not employ a real-time closed feedback loop between the scanner, the scanner card, and the image acquisition controller. FIG. 5 shows a typical system without a real-time closed feedback loop. The shortfall of a scanner system without a real-time closed feedback loop is that when a user is not satisfied with the scanned image, the user must adjust the image control settings and rescan the document. Depending on the throughput of a scanner and the design of the scanner control setting, the adjustment and the rescanning processes may be time consuming and laborious. FIGS. 2 and 3 show a system having a real-time closed feedback loop.

SUMMARY OF THE INVENTION

An objective of the invention is to significantly reduce the burden of necessity for the rescanning of documents if the scanned images are found unsatisfactory.

The present invention for accomplishing the above objective consists in a method for a scanner system having a scanner and an image acquisition controller having a display terminal, characterized by the steps of scanning documents, storing the image data in a fast retrieval memory or an image cache, loading that image data into an image processor and processing the data in the image processor to allow a user to find an optimal setting to enhance the image. If the processed image data is unsatisfactory, the data in the image cache can be reloaded into the image processor to reprocess the image data. This step will be repeated until the user finds the processed image data satisfactory.

The image processing and reprocessing operations are performed in hardware. Thus, they can be done fast enough to give an almost instantaneous result of the processing or reprocessing.

DESCRIPTION OF THE PREFERRED EMBODIMENTS

The primary justification for the development of a real-time closed-loop feedback scanner system is to save time and labor by obviating the need to reinsert documents for rescanning after discovering that the image quality of scanned documents is unsatisfactory. Rather than rescanning the documents to recapture the image data, the raw image data is captured the first time and can be reprocessed over and over again using different continuous small adjustments of the image settings until the processed image is satisfactory to the user.

To be effective, the scanner must possess adequate hardware performance in order to achieve the real-time closed feedback loop objective. This feature is not found in other currently existing scanner systems.

In terms of ease of use, the hardware/software architecture of this system provides the user with a tool which is much easier to use than any previously existing scanner device. It has been shown that optimal settings can be obtained in seconds whereas such settings are almost impossible to obtain using current techniques. This system provides a simple and intuitive user interface of self-explanatory command menus which eliminates the necessity for typing by the user. Typing and inserting documents into the scanner is laborious and time consuming and thus reduces a user's productivity. The command input path in this system displays command icons and properties of the scanned image data. The user may simply click on a command icon and adjust the image setting to a desirable setting. The feedback loop also makes it easier to find the desirable settings.

Figure 1:
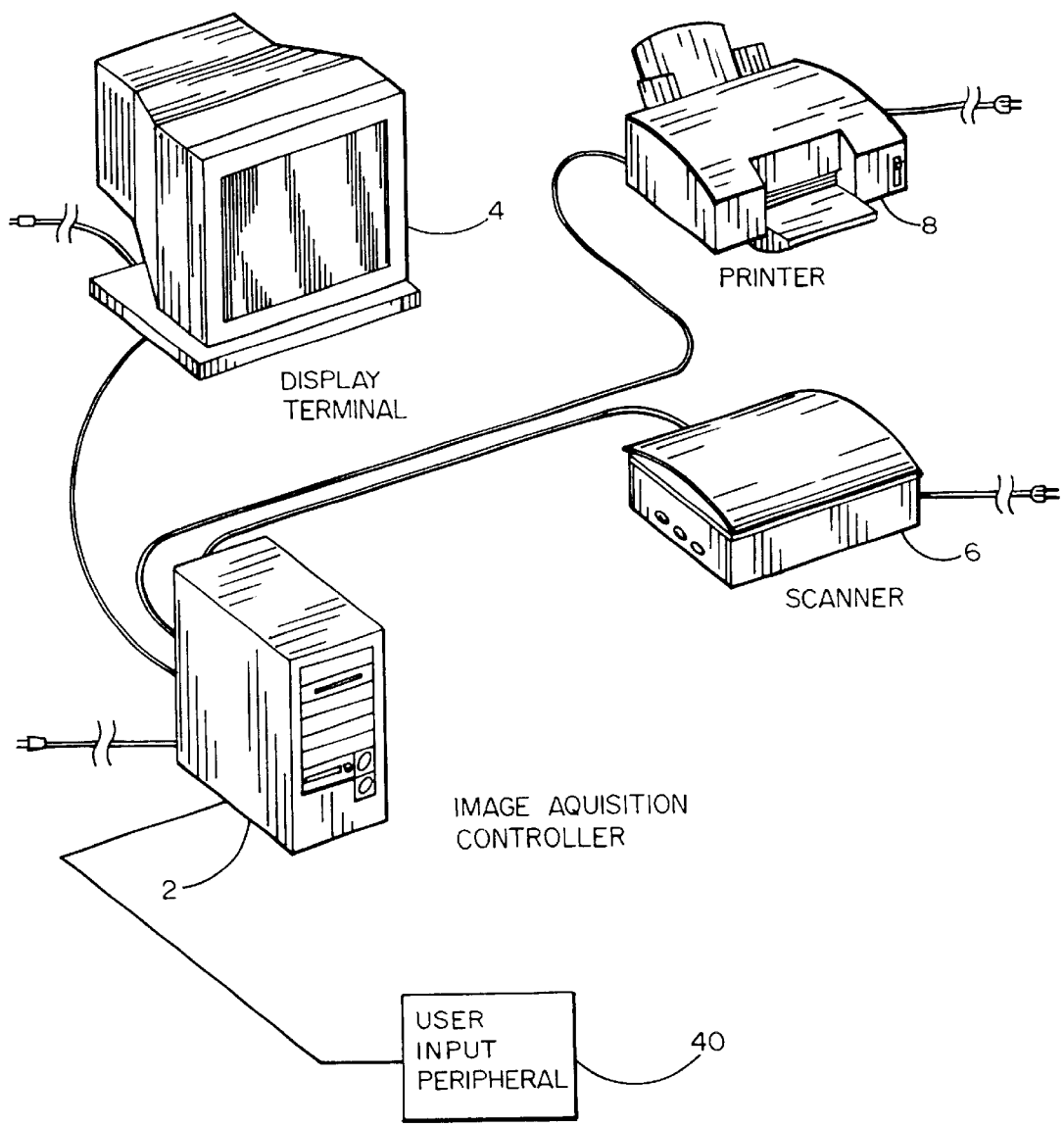
FIG. 1 is a block diagram showing an example of a modern scanner system.

FIG. 1 shows an example of a typical scanner system. Numeral 2 designates an image acquisition controller which interacts with the user through a display terminal 4. Numeral 6, a scanner, communicates with the image acquisition controller 2, numeral 8, a printer for printing out the scanned images, numeral 40, a user input peripheral. The image acquisition controller 2 contains communication software (not shown) that interfaces with the scanner 6. The image acquisition controller 2 can receive image data from the scanner 6.

Figure 2:
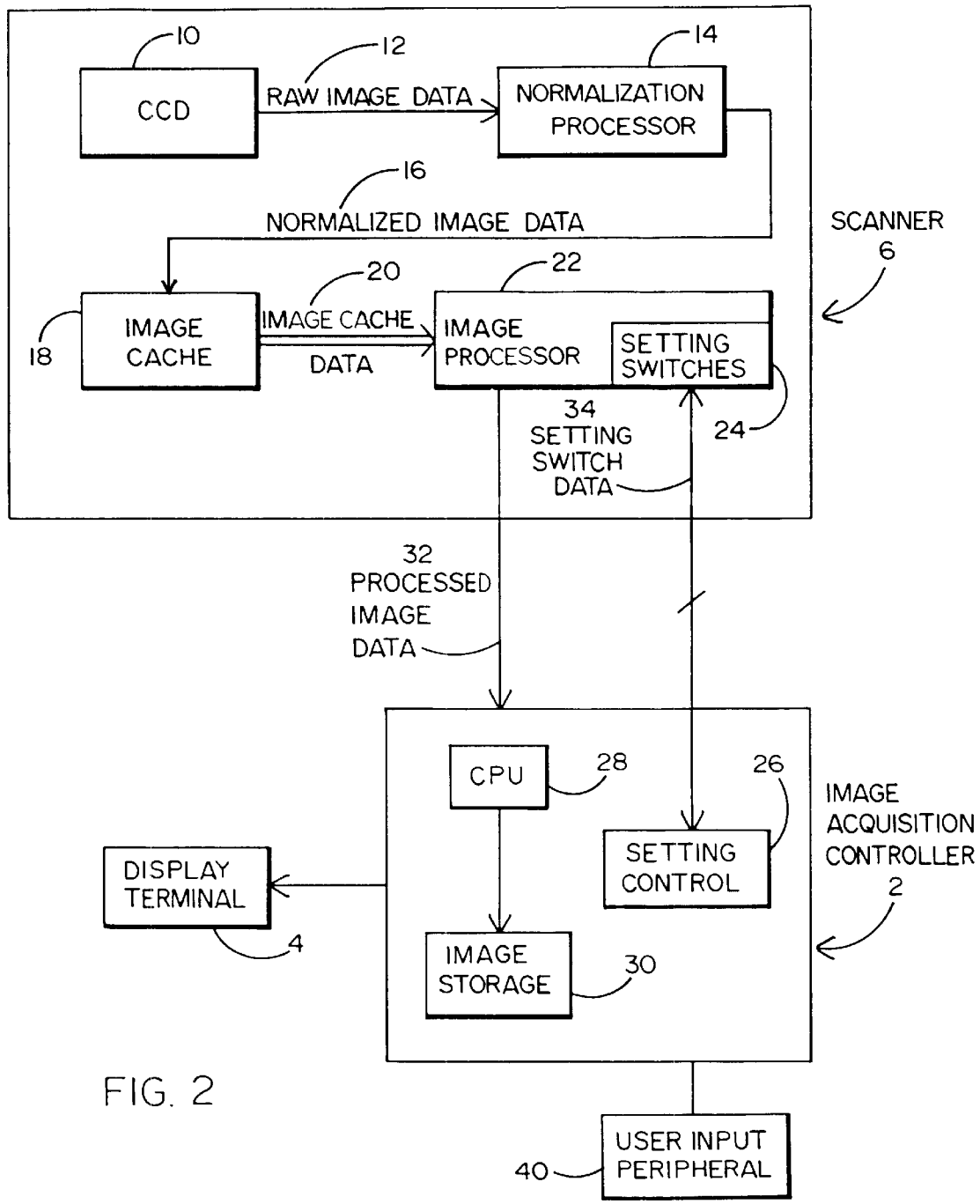
FIG. 2 is a block diagram depicting a design having an image cache resident on the scanner card.

FIG. 2 depicts one of the possible hardware block diagrams of the present invention. It includes an image acquisition controller 2, display terminal 4, scanner 6, charged couple device ("CCD") 10, normalization processor 14, image cache 18, image processor 22, settings 24, setting control 26, CPU 28, and image storage 30.

The CCD 10 generates raw multi-bit grayscale or color data 12 and this multi-bit raw image data 12 is fed into a normalization processor 14. The normalization processor 14 generates normalized image data 16 and it is stored in an image cache 18. The image cache 18 is comprised of a high speed memory. Typically, it is a static RAM type of device. Image cache data 20 from the image cache 18 is fed into an image processor 22. The image processor 22 contains setting switches 24 for processing the image cache data 20.

Therefore, the data path is comprised of the raw image data 12, normalized image data 16, image cache data 20, and processed image data 32.

The image acquisition controller 2 includes a setting control 26, CPU 28, and an image storage 30.

The setting switch data 34 generated by the setting control 26 interfaces with the setting switches 24 of the scanner 6. The user inputs the setting switch data 34 through the keyboard or mouse (not shown) of the image acquisition controller 2. The image processor 22 processes the image cache data 20 using the programmed setting switch data 34 as the parameters and generates processed image data 32. The processed image data 32 can be either multi-bit grayscale or color or bitonal. The processed image data 32 is routed to the image acquisition controller 2. The CPU 28 of the image acquisition controller 2 causes the processed image data 32 to be stored in the image storage 30 of the image acquisition controller 2. The image storage 30 may be a permanent type of storage, such as a hard drive (not shown) or a temporary type of memory, such as the main memory of the image acquisition controller 2. The processed image data 32 is then displayed in the display terminal 4 for viewing by the user.

Figure 3:
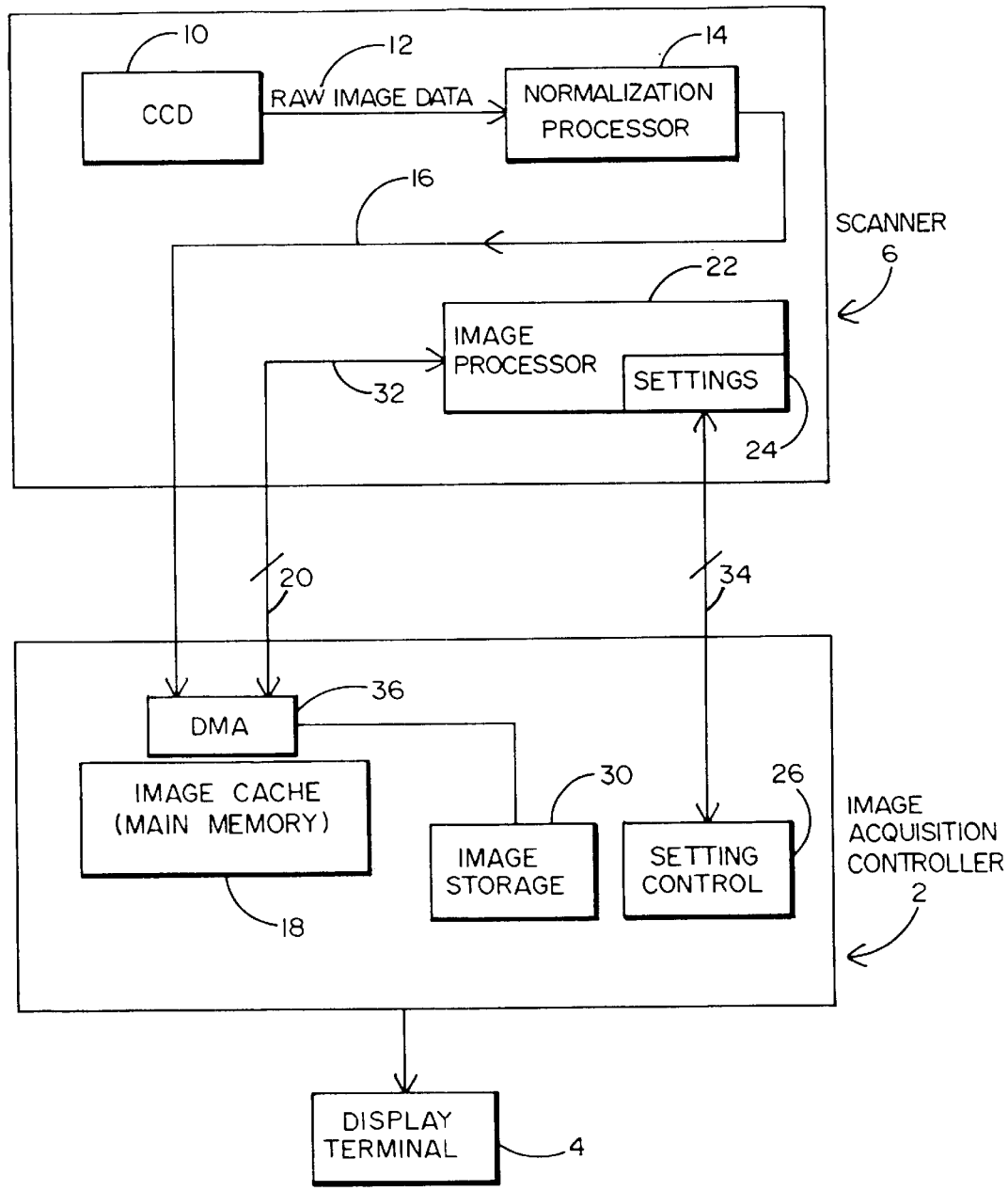
FIG. 3 is a block diagram depicting a design having an image cache not resident on the scanner card.

FIG. 3 depicts another configuration of the system, wherein the image cache is not resident on the scanner 6. The normalized image data 16 generated by the normalization processor 14 is routed to the image acquisition controller 2. The image acquisition controller 2 includes a direct memory access ("DMA") 36 for routing the normalized image data 16 into the image cache 18 inside the image acquisition controller 2. The image cache 18 may be configured as part of the image acquisition controller's 2 main memory (not shown) or it may be a separate memory (not shown) residing on the image acquisition controller 2 designed for this purpose.

Similar to the design depicted in FIG. 2, the setting switch data 34 generated by the setting control 26, interfaces with the setting switches 24 of the scanner 6. A user inputs the setting switch data 34 through the image acquisition controller's 2 keyboard or mouse (not shown).

The image processor 22 processes the image cache data 20 using the setting switch data 34 as the parameters and generates processed image data 32. The processed image data 32 is routed to the image acquisition controller 2. The CPU 28 of the image acquisition controller 2 causes the processed image data 32 to be stored in the image storage 30 of the image acquisition controller 2. The image storage 30 may be a permanent type of storage, such as a hard drive (not shown) or a temporary type of memory, such as the main memory of the image acquisition controller 2. The processed image data 32 is then displayed on the display terminal 4 for viewing by the user.

Figure 4:
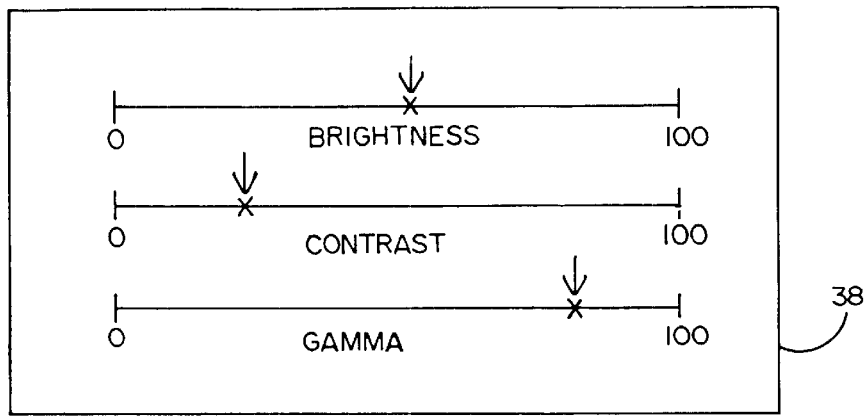
FIG. 4 depicts an image control setting presented on an image display that can be adjusted on the image acquisition controller.
Figure 5:
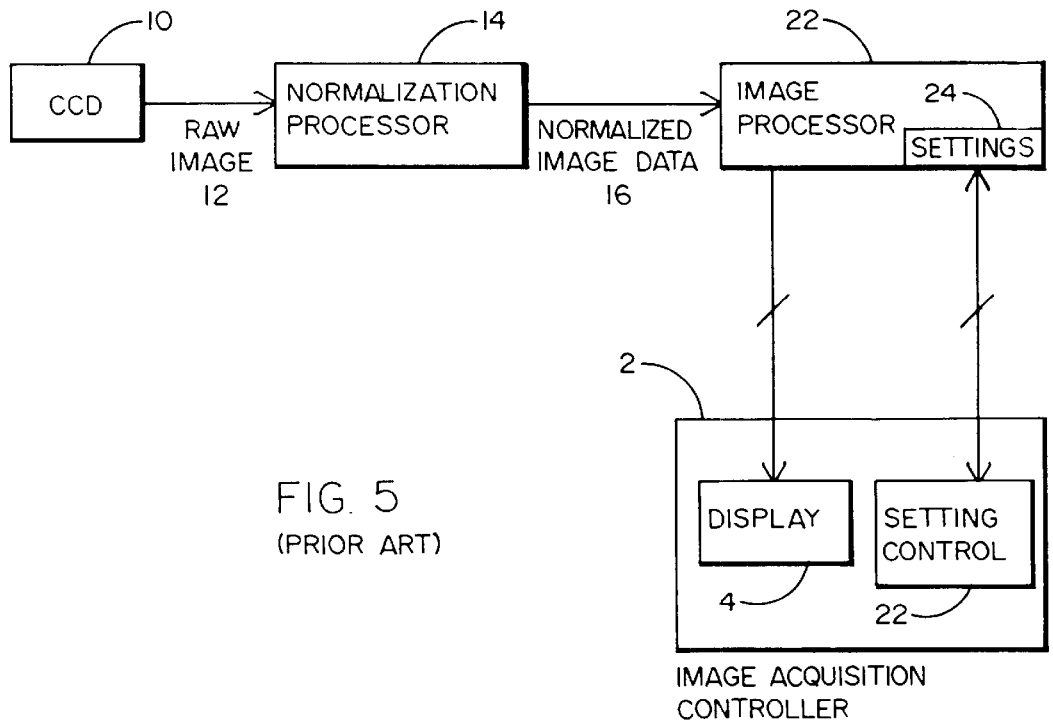
FIG. 5 depicts a scanner system without a real-time closed feedback loop.

FIG. 4 shows a user interface 38 for generating setting switch data 34 for the setting control 26 on the image acquisition controller 2. Examples of programmable parameters include: brightness, contrast, gamma, erosion, dilation, speckle removal, skew angle, and missing corner detection. A user can program the parameters through an external peripheral device connected to the image acquisition controller 2, such as a keyboard (not shown) or a mouse (not shown). The setting control 26 of the image acquisition controller 2 then generates setting switch data 34.

Figure 6:
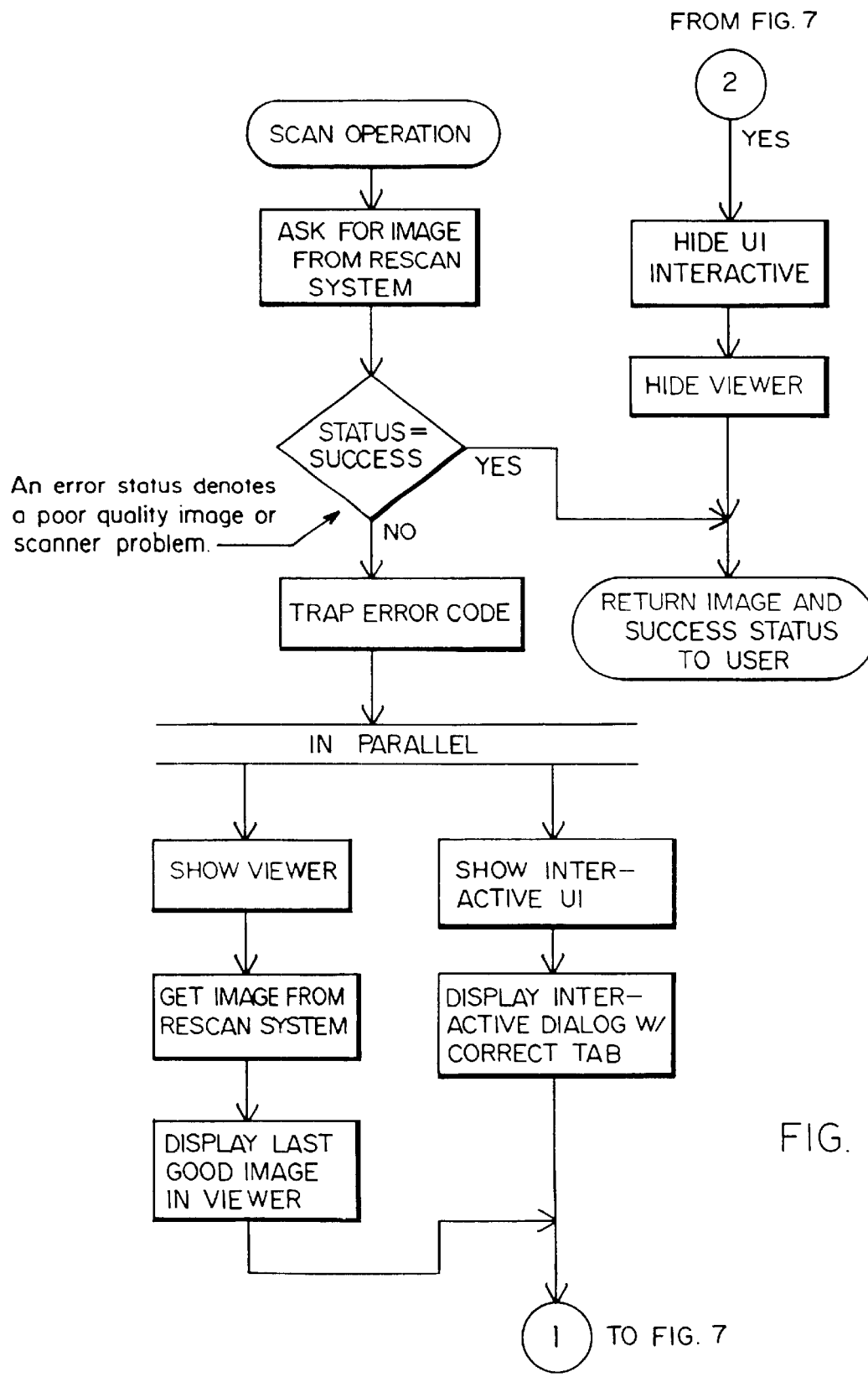
FIGS. 6 and 7 show a flow chart of the software implementing the real-time closed feedback loop.

FIG. 6 shows a flow chart to illustrate a method wherein the image acquisition controller 2 and the scanner 6 function in accordance with the present invention. The conditions on which a trap error code would be invoked include, but are not limited to, brightness out of range, contrast out of range, missing corner, blank page, paper jam, out of paper, cover open, no power, cable disconnected, communication error, timeout, and automatic image data crop failure. The method is separately executed as a process 1 (FIG. 7) for accepting or rejecting the processed image data 32 in accordance with the user's commands and a process 2 for the continuation of process 1 after the user accepts the processed image. Process 1 also processes images and redisplays the processed image for the user's acceptance or rejection. Process 1 is executed by promoting for inputs from the user through an external peripheral device, such as a keyboard or a mouse. Process 2 is the continuation of process 1 after the user issues an acceptance of the processed image.

Figure 7:
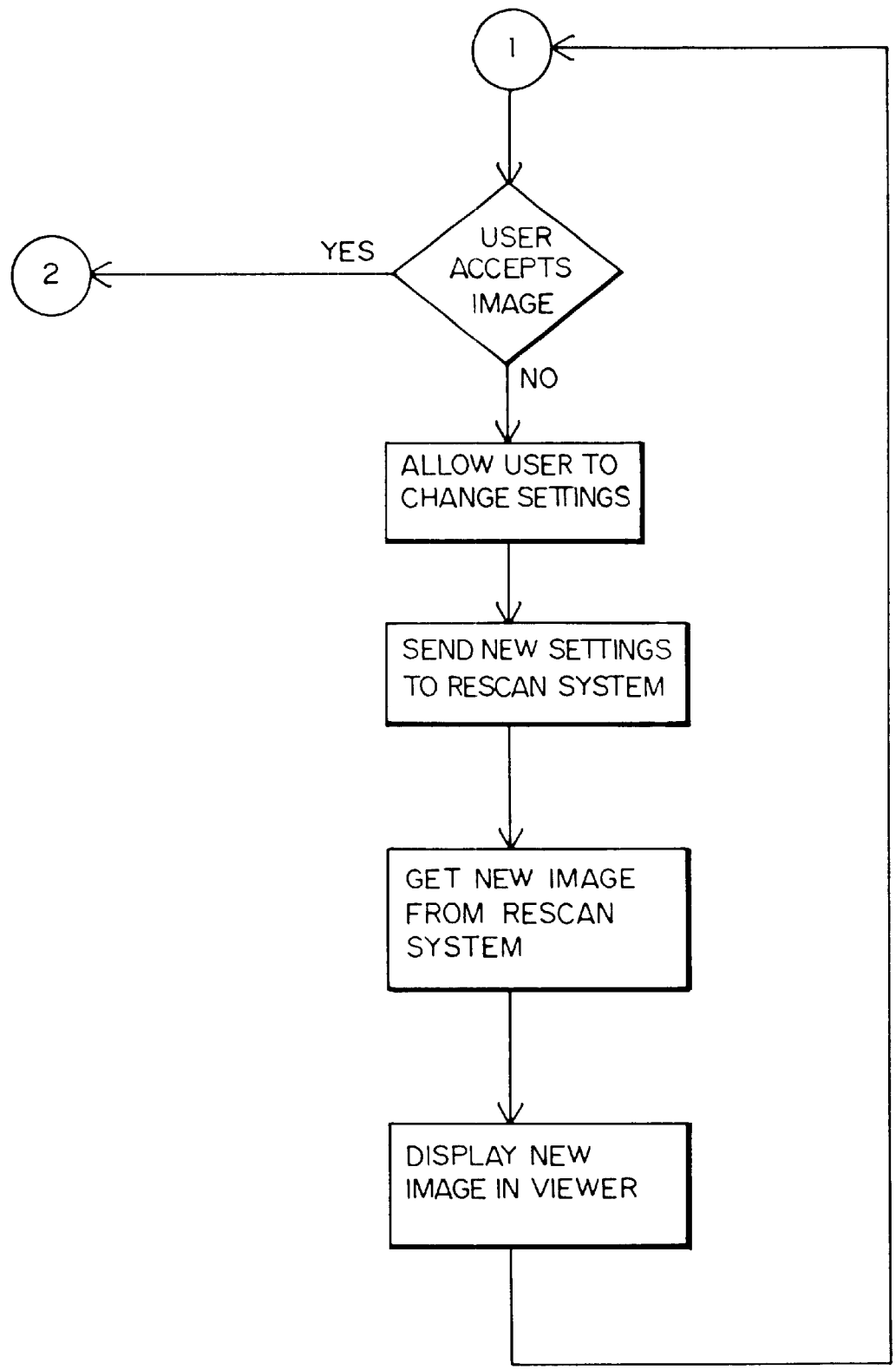

FIG. 7 is a flow chart showing the contents of the looping process of acceptance or rejection of the processed image by the user. The detail descriptions of the flow chart depicted in FIG. 7 are described as follows.

USER ACCEPTS IMAGE

This is a decision branch. Upon receipt of a user acceptance of the processed image data 32, the method proceeds to process 2, which is routed to the steps depicted in FIG. 6. Upon receipt of a user rejection of the processed image data 32, the method proceeds through the rest of process 1, as depicted in FIG. 7.

ALLOW USER TO CHANGE SETTINGS

At this step, the user is prompted with the set of available adjustable setting switch data.

SEND NEW SETTINGS TO RESCAN SYSTEM

At this step, the user inputs the setting switch data 34 through the user input peripheral 40. The setting switch data 34 is then transmitted to the setting switches 24 of the image processor 22.

GET NEW IMAGE FROM RESCAN SYSTEM

At this step, the image processor 22 sends a request to the image cache 18 requesting that image cache data 20 be sent to the image processor 22. Thereafter, the image cache data 20 is copied to the image processor 22. The image processor 22 processes the image cache data 20 using the setting switch data 34.

DISPLAY NEW IMAGE IN VIEWER

At this stage, after the image cache data 20 has been processed by the image processor 22, it notifies the image acquisition controller 2 of the completion status and that the processed image data 32 is ready for viewing. Thereafter, the user may request that the updated image be displayed on the display terminal 4.

DISPLAY NEW IMAGE IN VIEWER

If the trapping conditions are met, i.e., the image data is not within user-defined parameters, the processed image data 32 is displayed on the display terminal 4 for viewing by the user. At this stage, the process is looped back to the decision branch of USER ACCEPTS IMAGE and prompts the user for acceptance of the processed image data 32. If the user accepts it, process 1 proceeds to process 2. If the user rejects it, process 1 then continues through with the rest of the process, as described in the above.

We claim:

1. A scanning and image processing system having a set of user defined parameters, said system comprising:
   a scanner to scan a first document and generate image data corresponding to said first document;
   an image processor to receive the image data generated by said scanner, said image processor having image control switches that are set to process the image data; and
   an image acquisition controller interconnected with said image processor, said image acquisition controller providing switch data to said image processor by which to set the image control switches of said image processor,
   wherein the image data received and processed by said image processor is adjusted in real time by the steps of:
      (1) determining whether the image data received by said image processor is within the user defined parameters of said system; and
      (2) scanning a new document with said scanner and generating new image data for receipt by said image processor if the image data from the first document is within the user defined parameters; or
      (3) transmitting the switch data from said image acquisition controller to the image control switches of said image processor if the image data from the first documentation is outside the user defined parameters, said image processor processing the image data with the switch data; and
      (4) repeating step (1) and one of step (2) or step (3).

2. The scanning and image processing system recited in claim 1, wherein the switch data provided to said image processor by said image acquisition controller is entered manually into said image acquisition controller by a user of said system.

3. The scanner and image processing system recited in claim 2, further comprising a user input peripheral device by which the user manually enters the switch data into said image acquisition controller.

4. The scanning and image processing system recited in claim 1, wherein the switch data provided to said image processor by said image acquisition controller is adjustable.

5. The scanning and image processing system recited in claim 1, further comprising a video display at which to view the image data and the switch data after being processed by said image processor.

6. The scanning and image processing system recited in claim 1, further comprising a memory by which to capture and store the image data generated by said scanner, said image processor copying the image data stored in said memory.

7. The scanning and image processing system recited in claim 6, wherein said memory to store the image data is an image cache.

8. The scanning and image processing system recited in claim 1, further comprising image storage means in which to store the image data and the switch data after being processed by said image processor.

9. A scanning and image processing system having a set of user defined parameters, said system comprising:
   a scanner to scan a first document and generate image data corresponding to said first document;
   an image cache in which to capture and store the image data generated by said scanner;
   an image processor to copy the image data generated by said scanner and stored in said image cache, said image processor having image control switches that are set to process the image data;
   an image acquisition controller interconnected with said image processor, said image acquisition controller providing switch data to said image processor by which to set the image control switches of said image processor, and
   a video display at which to view the image data processed by said image processor,
   wherein the image data copied and processed by said image processor is adjusted in real time by the steps of:
      (1) determining whether the image data copied by said image processor is within the user defined parameters of said system; and
      (2) scanning a new document with said scanner and generating new image data for capture by said image cache if the image data from the first document is within the user defined parameters; or
      (3) transmitting the switch data from said image acquisition controller to the image control switches of said image processor if the image data from the first documentation is outside the user defined parameters, said image processor processing the image data with the switch data; and
      (4) repeating step (1) and one of step (2) or step (3).

10. The scanning and image processing system recited in claim 9, wherein the switch data provided to said image processor by said image acquisition controller is entered manually into said image acquisition controller by a user of said system at a user input peripheral device.

* * * * *